United States Patent
Chen et al.

(10) Patent No.: US 11,818,493 B2
(45) Date of Patent: Nov. 14, 2023

(54) FIRE SOURCE DETECTION METHOD AND DEVICE UNDER CONDITION OF SMALL SAMPLE SIZE AND STORAGE MEDIUM

(71) Applicant: Anhui University, Hefei (CN)

(72) Inventors: Jie Chen, Hefei (CN); Jianming Lv, Hefei (CN); Zihan Cheng, Hefei (CN); Zhixiang Huang, Hefei (CN); Haitao Wang, Hefei (CN); Bing Li, Hefei (CN); Huiyao Wan, Hefei (CN); Yun Feng, Hefei (CN)

(73) Assignee: Anhui University, Hefei (CN)

( * ) Notice: Subject to any disclaimer, the term of this patent is extended or adjusted under 35 U.S.C. 154(b) by 0 days.

(21) Appl. No.: 17/662,210

(22) Filed: May 5, 2022

(65) Prior Publication Data

US 2023/0188671 A1  Jun. 15, 2023

(30) Foreign Application Priority Data

Dec. 9, 2021 (CN) .......................... 202111502053.X (51) Int. Cl.
*H04N 5/33* (2023.01)
*G06V 20/70* (2022.01)
(Continued)

(52) U.S. Cl.
CPC ............ *H04N 5/33* (2013.01); *G06T 3/4038* (2013.01); *G06V 10/34* (2022.01); *G06V 10/82* (2022.01); *G06V 20/70* (2022.01)

(58) Field of Classification Search
None
See application file for complete search history.

(56) References Cited

U.S. PATENT DOCUMENTS 10,049,434 B2 * 8/2018 Mosher .................... G06T 7/12
2014/0027131 A1 * 1/2014 Kawiecki ............. A62C 3/0228
169/53
(Continued)

FOREIGN PATENT DOCUMENTS

CN  112735083 A * 4/2021 ........... G06N 3/0454
CN  113139500 A * 7/2021
(Continued)

OTHER PUBLICATIONS

J. Miao, et al., "Fire Detection Algorithm Based on Improved YOLOv5," 2021 International Conference on Control, Automation and Information Sciences (ICCAIS), Xi'an, China, 2021, pp. 776-781, doi: 10.1109/ICCAIS52680.2021.9624619. (Year: 2021).*
(Continued)

*Primary Examiner* — Stefan Gadomski
(74) *Attorney, Agent, or Firm* — DLA PIPER LLP (US)

(57) ABSTRACT

The present disclosure provides a fire source detection method and device under the condition of a small sample size, and a storage medium, and belongs to the field of target detection and industrial deployment. The method includes the steps of acquiring fire source image data from an industrial site; constructing a fire source detection model; inputting the fire source image data to the fire source detection model, and analyzing the fire source image data via the fire source detection model to obtain a detection result, where the detection result includes a specific location, precision and type of a fire source. By means of the method, the problems of insufficient sample capacity and difficulty in training under the condition of a small sample size are solved, and different enhancement methods are used to greatly increase the number and quality of samples and improve the over-fitting ability of models.

16 Claims, 7 Drawing Sheets

(51) Int. Cl.
  *G06V 10/82* (2022.01)
  *G06V 10/34* (2022.01)
  *G06T 3/40* (2006.01)

(56) References Cited

U.S. PATENT DOCUMENTS

2016/0321900 A1* 11/2016 Rao .................. B05B 12/12
2021/0049885 A1* 2/2021 Lee .................. G08B 17/00

FOREIGN PATENT DOCUMENTS

| CN | 113221838 | A | * | 8/2021 |
| CN | 113408479 | A | * | 9/2021 |
| CN | 113435373 | A | * | 9/2021 |
| CN | 113688921 | A | * | 11/2021 |
| CN | 113713292 | A | * | 11/2021 |
| CN | 214912972 | U | * | 11/2021 |

OTHER PUBLICATIONS

W. S. Mseddi, R. Ghali, M. Jmal and R. Attia, "Fire Detection and Segmentation using YOLOv5 and U-NET," 2021 29th European Signal Processing Conference (EUSIPCO), Dublin, Ireland, 2021, pp. 741-745, doi: 10.23919/EUSIPCO54536.2021.9616026. (Year: 2021).*

Y. Zhou, M. Wu, Y. Bai and C. Guo, "Flame Detection with Pruned and Knowledge Distilled YOLOv5," 2021 5th Asian Conference on Artificial Intelligence Technology (ACAIT), Haikou, China, 2021, pp. 780-785, doi: 10.1109/ACAIT53529.2021.9731227. (Year: 2021).*

Chenghua Li, Bin Yang, Hao Ding, Hongling Shi, Xiaoping Jiang, Jing Sun, Real-time video-based smoke detection with high accuracy and efficiency, Fire Safety Journal, vol. 117, 2020, 103184, ISSN 0379-7112, https://doi.org/10.1016/j.firesaf.2020.103184.*

G. S. C.A., N. Bhowmik et al., "Experimental Exploration of Compact Convolutional Neural Network Architectures for Non-Temporal Real-Time Fire Detection," 2019 18th IEEE International Conference on Machine Learning and Applications (ICMLA), Boca Raton, FL, USA, 2019, pp. 653-658, (Year: 2019).*

Xu R, Lin H, Lu K, Cao L, Liu Y. A Forest Fire Detection System Based on Ensemble Learning. Forests. 2021; 12(2):217. https://doi.org/10.3390/f12020217.*

* cited by examiner

FIRE SOURCE DETECTION METHOD AND DEVICE UNDER CONDITION OF SMALL SAMPLE SIZE AND STORAGE MEDIUM

CROSS REFERENCE TO RELATED APPLICATION

This application claims priority to Chinese Patent Application No. 202111502053.X, filed Dec. 9, 2021, which is herein incorporated by reference in its entirety.

TECHNICAL FIELD

The present disclosure is directed to the field of target detection and industrial deployment, and particularly relates to a fire source detection method and device under the condition of a small sample size and a storage medium.

BACKGROUND ART

Fire prevention and control has always been one of the public safety issues of great concern to people. A fire can result in a tremendous loss of life and property and irreversible damage to society, and therefore, it is essential to implement fire prevention and control. Currently, fire detectors are widely used in fire detection. However, a detection result from a single fire detector is often unreliable, and the detection speed is not high enough to have a real-time effect. Ting et al. proposed a multi-sensor data blending algorithm to blend fire-related physical parameters acquired. Moreover, a fire detector has many limitations: equipment must be close to a fire source. That is, the equipment cannot perform detection without any physical contact. Additionally, the alarm cannot be triggered until a large amount of smoke, CO and other fire-related physical parameters are generated a certain time after the outbreak of a fire, and it is impossible to clearly sense the severity and detailed location information of the fire, which causes much inconvenience to fire detection.

With the ongoing development of social economy and technology, fire detection technology based on computer vision has been widely used. Nowadays, the video monitoring system has been widely used all over the industrial site and using the existing video monitoring system to achieve fire detection can not only lower cost, but also improve the capability of fire detection. Given that the convolution neural network (CNN) mainly implements the classification of fire images and non-fire images, without considering objects similar to fire in most cases, a lot of false alarms for fire-like objects are present. So far, various improved CNNs have emerged one after another, which are roughly divided into the following two categories. (1) Two Stage: the main idea of this method is to first generate a series of sparse candidate boxes through the heuristic method or CNN network, and then classify and regress these candidate boxes. Such method is represented by Faster R-CNN, Centernet2 and so on, which has the advantage of high accuracy, but also the drawback of low speed. (2) One Stage: the main idea of this method is to uniformly perform intensive sampling in different locations of a picture, then use CNN to extract features for direct classification and regression, and then output the classification probability and coordinates of objects. Such method is represented by SSD, YOLOv5, RetinaNet and so on, which has the advantage of high speed given that the whole process is implemented only in one step.

Since it is usually difficult to acquire a large number of available samples in industrial applications, most of the foregoing methods are based on small sets of samples. At the same time, due to the broad range of scenes acquired in the industrial site, the target detected merely accounts for a small proportion of the original image, such that target characteristics cannot be fully reflected, marking another difficult point in detection. As compared to small-sample-size classification, small-sample-size detection is faced with following challenges: first, it is required to identify both the category and the target location; in the detection process, not only the high-level semantic information about classification should be extracted, but the low-level features about localization should be learned; the foreground and background are liable to be confused, and regression parameters are hardly acquirable from a source dataset. The above detection methods cannot solve the challenges yet.

Therefore, embodiments of the present disclosure provide a fire source detection method under the condition of a small sample size.

SUMMARY

In order to overcome the foregoing deficiency existing in the prior art, the present disclosure provides a fire source detection method and device under the condition of a small sample size and a storage medium.

To achieve the foregoing objective, the present disclosure provides the following technical solutions.

Embodiments of the present disclosure are directed to a fire source detection method under the condition of a small sample size, including the following steps:
acquiring fire source image data from an industrial site;
constructing a fire source detection model; and
inputting the fire source image data to the fire source detection model, and analyzing the fire source image data via the fire source detection model to obtain a detection result, where the detection result includes a specific location, precision and type of a fire source; where
said constructing the fire source detection model specifically includes:
introducing a convolutional block attention lightweight attention module kCBAM) into a backbone network of a YOLOv5 algorithm to construct a CBAM structure;
introducing Label Smoothing into a prediction layer of the YOLOv5 algorithm;
introducing a data enhancement method Mosaic9 into the YOLOv5 algorithm to construct an improved YOLOv5 model; and
training the improved YOLOv5 model by using the fire source image data to obtain a model weight of fire source detection and the fire source detection model.

Preferably, said acquiring fire source image data from an industrial site specifically includes:
acquiring fire source video data in different scenes by using infrared imaging and visible light imaging cameras, and saving the fire source video data.

Preferably, before training the improved YOLOv5 model using the fire source image data, the method further includes preprocessing the fire source image data, which specifically includes:
labeling the acquired fire source image data, including labeling target location information and type information of images, to obtain a label file;

conducting data enhancement on the label file to increase a sample capacity of the fire source image data and the number of fire source targets in the fire source images; and training the improved YOLOv5 model by using the fire source image data obtained after data enhancement.

Preferably, said conducting data enhancement on the label file includes:

increasing the sample capacity of the fire source image data by flipping, translating and scaling the fire source image data; and increasing the number of the fire targets in the fire source images via a spoon-feeding data enhancement method.

Preferably, the spoon-feeding data enhancement method includes:

reading the label file to determine whether there are any targets in the file that need to be enhanced;

copying the targets that need to be enhanced and randomly converting the copied targets;

pasting the randomly converted targets onto original images or other image; and if the pasted new targets do not overlap with original targets, pasting the new targets on the images using Poisson blending to obtain enhanced images and labels.

Preferably, the spoon-feeding data enhancement method randomly converts a target object in a way of changing the size by ±20% and rotating at the angle of ±15°.

Preferably, a smoothened label obtained via t Label Smoothing is:

$$q'_i = (1-\varepsilon)q_i + \frac{\varepsilon}{K}$$

where $q_i$ denotes a ground truth label, $\varepsilon$ denotes a constant, and K denotes the number of types under classification.

The fire source detection method under the condition of a small sample size according to claim 4, where the data enhancement method Mosaic9 refers to the process of combining 9 images into one picture through random cropping, random scaling, and random arrangement.

Preferably, existing fire source image data of other scenes is acquired on an Internet side, and the improved YOLOv5 model is trained through the fire source image data obtained after data enhancement and the existing fire source image data.

Embodiments of the present disclosure further provide a fire source detection device for industrial purposes under the condition of a small size, the device including a memory, a processor and a computer program stored in the memory and executable on the processor, where the fire source detection method under the condition of a small sample size is implemented when the processor executes the computer program.

Embodiments of the present disclosure also provide a computer-readable storage medium storing computer programs, and when the computer programs are executed by a processor, the fire source detection method under the condition of a small sample size is implemented.

The fire source detection method under the condition of a small sample size has the following advantages:

(1) The problems of insufficient sample capacity and difficulty in training under the condition of a small sample size are solved, and different enhancement methods are used to greatly increase the number and quality of samples and improve the over-fitting ability of models.

(2) Most of the images acquired in an industrial site contain small targets, and the method overcomes the difficulty in small target detection, and improves the detection accuracy of small targets.

BRIEF DESCRIPTION OF THE DRAWINGS

In order to more clearly explain the embodiments of the present disclosure and the design solution, accompanying drawings required for the embodiments will be briefly introduced below. The accompanying drawings in the following description show merely some embodiments of the present disclosure, and other drawings may be derived from these accompanying drawings by a person of ordinary skill in the art without creative efforts.

DETAILED DESCRIPTION OF THE EMBODIMENTS

To enable those skilled in the art to better understand and implement the technical solutions of the present disclosure, the present disclosure is described below in detail with reference to the accompanying drawings and specific embodiments. The following embodiments are only used for describing the technical solutions of the present disclosure more clearly and are not intended to limit the scope of protection of the present disclosure.

Embodiment 1

Figure 1:
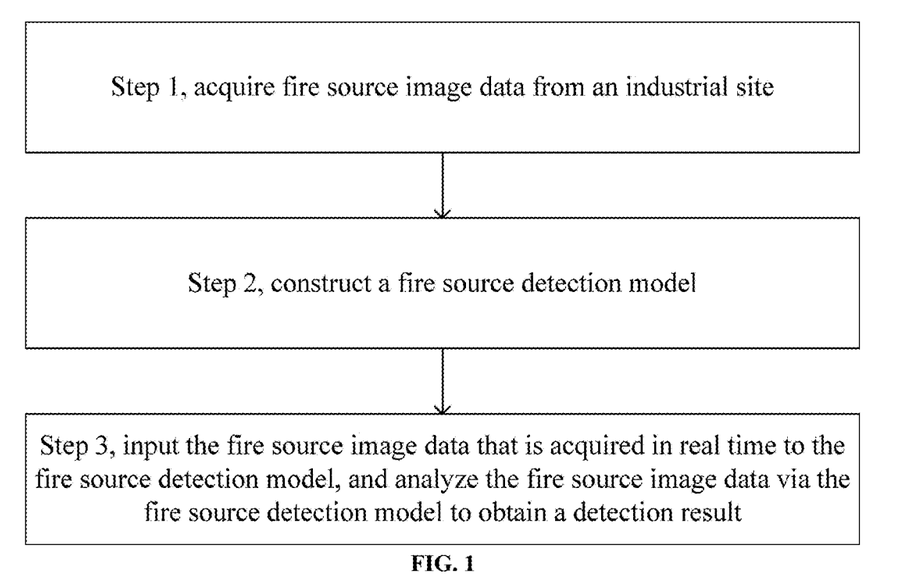
FIG. 1 is a flowchart of a fire source detection method under the condition of a small sample size according to embodiment 1 of the present disclosure.

Embodiments of the present disclosure provides a fire source detection method under the condition of a small sample size. Specifically, as shown in FIG. 1, the fire source detection method includes the following steps:

Step 1, acquire fire source image data from an industrial site.

In step 1, fire source video data in different scenes is acquired by using infrared imaging and visible light imaging cameras, and is saved and converted into pictures for network model training.

The experimental dataset used in the present disclosure is a self-made Fire-Detection Dataset, and 4783 images with a fire source are selected from images which are all taken from pictures acquired in the industrial site.

Step 2, construct a fire source detection model.

Step 2.1, optimize the YOLOv5 algorithm.

(1) A lightweight attention module CBAM is introduced into a backbone network of a YOLOv5 algorithm to construct a CBAM structure.

Figure 3:
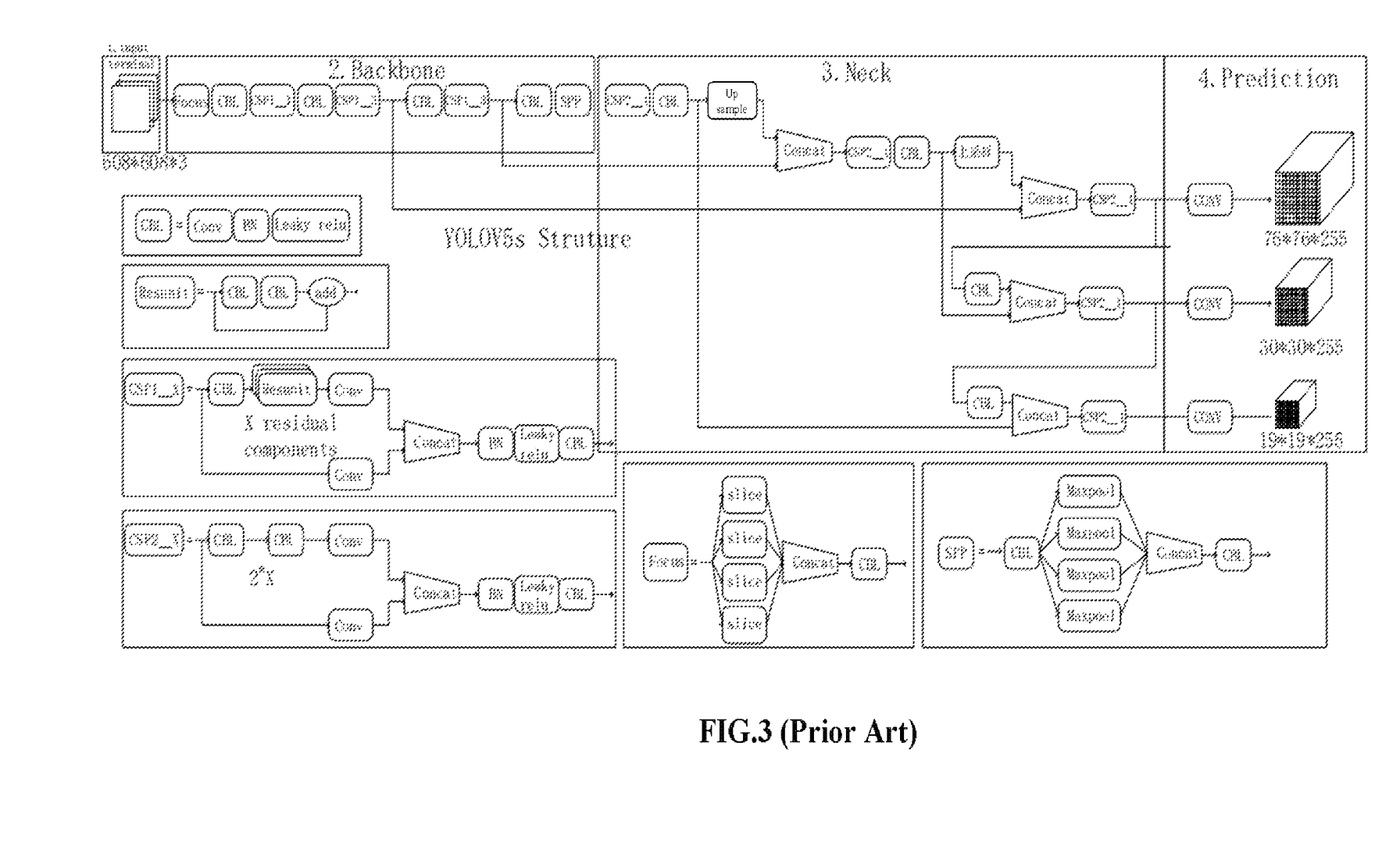
FIG. 3 shows an overall architecture of YOLOv5.

Existing YOLOv5 algorithm is adopted in this embodiment, and the overall architecture of YOLOv5 is shown in FIG. 3. YOLOv5 algorithm is a one-stage target detection algorithm, which includes some new improvement ideas on the basis of YOLOv4 to achieve great improvement in terms of both speed and precision. In the model training stage, some improvement ideas are put forward, mainly including Mosaic data enhancement, self-adaptive anchor box calculation and self-adaptive picture scaling. The backbone part integrates some new ideas including Focus structure and CSP structure from other detection algorithms. Regarding a target detection network, some layers are often inserted between the BackBone and the final Head output layer, and the FPN+PAN structure is added to Yolov5. The anchor box mechanism of the output layer is the same as that of YOLOv4, and the main improvements lie in the loss function GIOU_Loss during training and DIOU_nms filtered by a prediction box.

As can be seen from FIG. 3, YOLOv5 is substantially similar to YOLOv4 in structure, apart from the use of two different types of CSP in Backbone and Neck. In Backbone, CSP1_X with a residual structure is used, since Backbone is a deep network with multiple layers, the addition of the residual structure allows for the enhancement of gradient values when back propagation is carried out between layers, which can effectively prevent the vanishing gradient problem caused by network deepening and yield finer-grained features. In Neck, CSP2_X is used, which, compared with simple CBL, divides the output of the backbone network into two branches and then conducts concat on the branches, thereby strengthening the ability of the network to blend features and retain more abundant feature information. The Focus structure is added in YOLOv5 for picture slicing, where an image of 3×608×608 is taken as the input, which, after the slicing operation, becomes a feature image of 12×304×304, and finally, the feature image becomes a feature image of 32×304×304 after primary convolution using 32 convolution kernels. Through this slicing structure, more fine-grained features can be retained.

At present, YOLOv5 is widely used in industry because of its high speed, accuracy, lightweight and many other advantages. The present disclosure mainly focuses on YOLOv5, on this basis, the algorithm is improved and applied to actual projects to yield better results.

Figure 4:
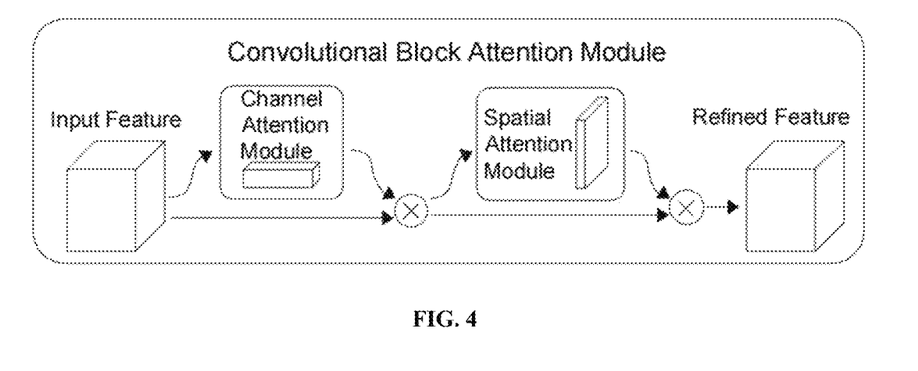
FIG. 4 is a schematic diagram illustrating a CBAM structure with embedding of a backbone network.

In fire detection, there are many small targets in the acquired dataset. Therefore, the present disclosure introduces a lightweight attention module CBAM into a backbone network to construct a CBAM structure, as shown in FIG. 4. CBAM is an attention module combining channel and space, which can tell the network to focus on a certain part, and realize the prominent performance of important features correspondingly, while suppressing those less prominent features.

It infers the attention weight along the two independent dimensions of the channel and space in turn, and then multiplies the attention weight by input feature mapping to optimize self-adaptive features. The attention module improves the ability of the feature extraction network to express features of small targets in large-scale scenes, as well as the ability to focus on small-scale fire source targets.

(2) Label Smoothing is introduced into a prediction layer of the YOLOv5 algorithm.

Label smoothing is first applied to classification algorithm, and then introduced into target detection algorithm. The target detection algorithm has two branches of classification and regression, which mainly functions in classification and is one of regularization methods. Its main idea is to transform the distribution of ground truth labels such that they no longer follow the one-hot form. A smoothened label obtained via Label Smoothing is as follows:

$$q'_i = (1-\varepsilon)q_i + \frac{\varepsilon}{K} \quad (1)$$

where $q_i$ denotes a ground truth label, $\varepsilon$ denotes an extremely small constant, and K denotes the number of types under classification. After Label Smoothing, the problem of excessive dependence of models on labels can be reduced, and the low accuracy of labels can be effectively avoided. Label Smoothing is introduced into a prediction layer of the YOLOv5, which improves the label accuracy of the detection box.

(3) A data enhancement method Mosaic9 is introduced into the YOLOv5 algorithm to construct an improved YOLOv5 model.

In addition to the basic data enhancement method, Mosaic data enhancement is also used in YOLOv5. In this embodiment, four pictures are randomly cropped, scaled and then randomly arranged and spliced to form a picture, which not only achieves the goal of enriching the dataset, but also increases the small-sized target samples and improves the speed of network training. In the normalization operation, four pictures can also be calculated at a time, while the mini-batch does not necessarily have to be very large, which lowers the memory requirements of the model. In view of the small proportion of the target size in the datasets acquired, the present disclosure adopts the enhanced version Mosaic9 of the Mosaic method, which combines 9 images into one image through random cropping, random scaling, and random arrangement, and then puts the newly synthesized image into the network for training. The enhanced Mosaic9 method improves the performance of target detection, especially the performance of small target detection.

Figure 2:
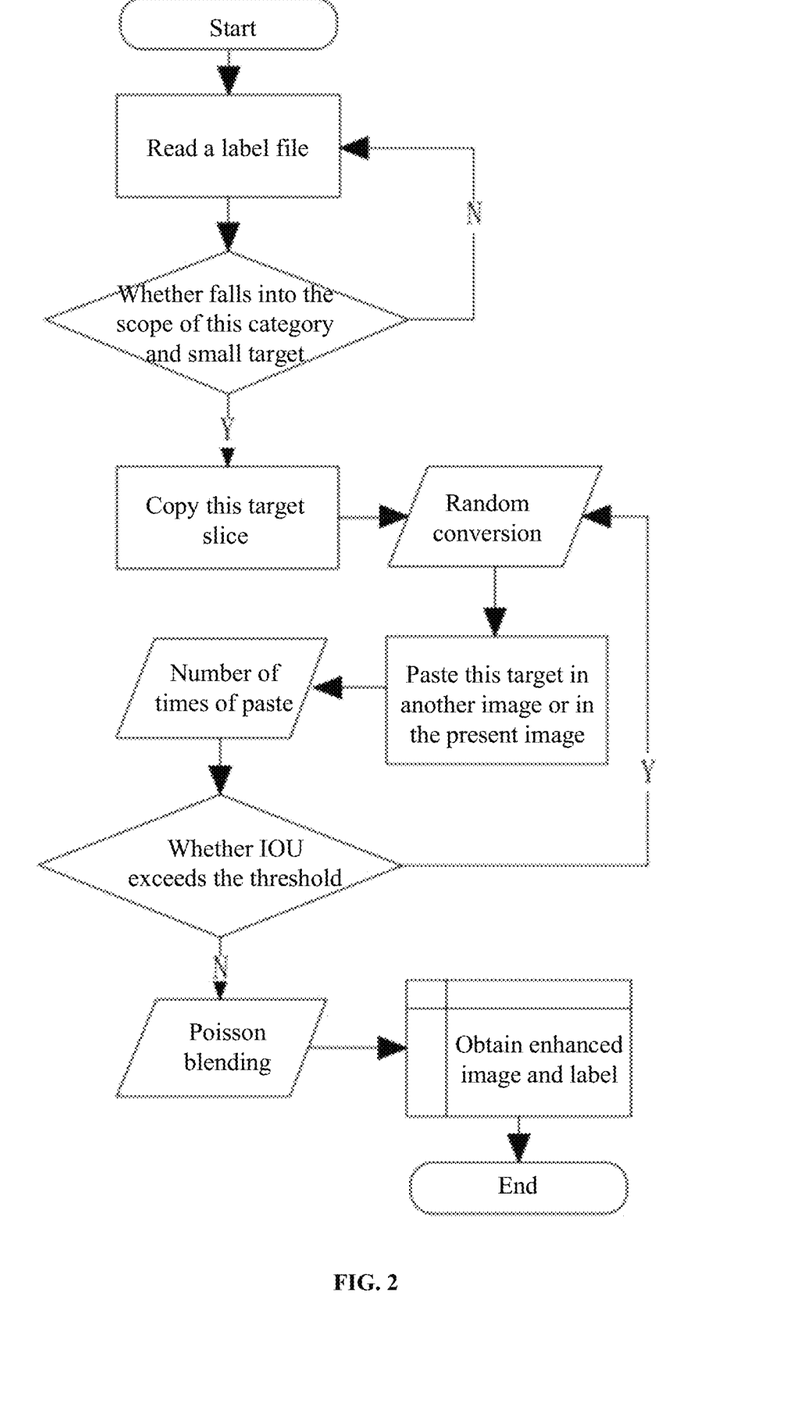
FIG. 2 is a flowchart illustrating data enhancement.

Step 2.2, preprocess the fire source image data, as shown in FIG. 2.

Step 2.2.1, Label the acquired fire source image data, which includes labeling target location information and type information of images, to obtain a label file.

Specifically, labeling marking software is used for labeling, and the target location information and type information labeled in images are stored as XML files required for training to form a label file. Given the limited number and monotonous scene of fire images acquired from an industrial site, it is required to conduct data expansion on datasets for the purpose of enabling the network to better learn target features.

Step 2.2.2, Conduct data enhancement on the label file to increase a sample capacity of the fire source image data and the number of fire source targets in the fire source images.

(1) Common data enhancement methods include flipping, rotation, translating, scaling and so on. Rotation and horizontal flipping are used for data enhancement, and the angular transformation of images in the training set enhances the robustness of the training model to images at different angles, thus improving the generalization ability of the model. Through common data enhancement methods, the present disclosure can increase manyfold the number of sheets of a dataset offline, and increase the sample capacity, thus solving the problem of insufficient sample capacity under the condition of small sample size.

(2) In the data acquired by the present disclosure, the sample capacity is small, and besides, there are a large number of small targets, given the fact that a fire is generally caused by a small flame at a single point. Regarding the field of industrial fire control, it is also required to detect the existence of the fire source and send out alarm information for timely disposal before the fire is expanded. Therefore, it is particularly important to ensure accurate detection of small targets. Detection of small objects can be achieved by increasing the resolution of input images or by blending high-resolution features and high-dimensional features of low-resolution images. However, this method of using higher resolution increases computational overhead, without addressing the imbalance between small and large objects. Therefore, copy-and-paste data enhancement, namely, spoon-feeding data enhancement method is adopted to increase the number of targets in the sample. The spoon-feeding data enhancement method includes the procedure of copying a target object in an image, converting the target object randomly (size change of ±20%, angle rotation of ±15°), and pasting it onto a new location, while ensuring that the pasted object does not overlap with any existing object and is at least five pixels away from an image boundary.

The spoon-feeding data enhancement specifically includes:
  determining, by reading a label file, whether there is any target that needs to be enhanced, and determining whether the target belongs to a small target;
  starting to copy the target and randomly converting the copied target if the condition is satisfied,
  pasting the randomly converted target onto an original image or other image, and determining whether the pasted new target overlaps with the original target (determining based on IOU threshold);
  if it is less than the set IOU threshold, proceeding to the next step, and using Poisson blending to paste the new target onto the image (this method is intended to paste the new target without causing any incompatibility with the original image); and
  saving enhanced images and labels.

This method solves the problems of small sample capacity, lack of diversity of small target location and insufficient information under the condition of a small sample size. More positive samples of a small target can be matched on the same image, thus improving the detection accuracy of the small target.

Step 2.2.4, Search for some relevant fire source image datasets from the Internet side, and re-label and add them to the dataset, thereby increasing the diversity of dataset scenes, improving sample quality, reducing the over-fitting phenomenon possibly appearing in a training process, and improving the generalization ability of a machine learning model, so as to get out of the dilemma under the condition of a small sample size.

Step 2.3, training the improved YOLOv5 model by using the fire source image data obtained after data enhancement and existing fire source image data to obtain a model weight of fire source detection and the fire source detection model with high detection precision.

In the model training stage, momentum is set to 0.9, Adam optimizer is taken as the optimizer, the decay value is 0.0005, the batch size is 2, and epoch is 200. Small-batch stochastic gradient descent is used for optimization, and the initial Learning rate is 0.01. The code-based training experimental environment of the present disclosure includes: Inter Core i5-10600KF CPU @ 4.10 GHz, memory of 32 GB, NVIDIA GeForce RTX 2060Ti, and Windows 10, 64-bit operating system. The present disclosure takes Python as the programming language, pytorch1.7 as the deep learning framework, and CUDA10.2 and CUDNN7.6.4 as GPU accelerator libraries. The engineering application experimental environment of the present disclosure includes Advantech industrial personal computer and Corerain nebula accelerator X3.

Step 3, input the fire source image data that is acquired in real time to the fire source detection model, and analyze the fire source image data via the fire source detection model to obtain a detection result. The detection result includes a specific location (upper-left coordinates and lower-right coordinates), precision and type of a fire source.

The detection process specifically includes the procedure of detecting an image acquired in real time through the trained model weight, and judging whether there is fire source and the location information of the fire source on the image acquired in real time based on the characteristics of the fire target obtained via model weight learning and a series of parameters.

Under the premise of the above detection method, models are also deployed in the embodiment. The present disclosure realizes the function of target detection in a computer client side. Under the Windows system, the GPU is used to train the neural network to obtain the model weight with well-trained fire source detection. With the rapid development of mobile Internet, more and more applications based on deep learning are now emerging on mobile equipment and industrial personal computers commonly used in industry, which not only brings great convenience to people's life, but also provides real-time monitoring for industrial fire control.

The industrial application development tools and environment of the fire source detection model provided in this embodiment are configured as follows:

Advantech industrial personal computer: industrial personal computer (IPC-610L) with a 4U-high 14-slot backplane rack-mounted industrial computer case, equipped with a front-facing fan, mainly having the following characteristics: friendly user interface, easy maintenance with a front-facing filter, support for 250 W ATX PFC PS/2 power supply, front-facing power supply and HDD status indicator, oscillation and shock resistance, stable work at high temperature, shockproof drive table capable of holding 3 front-end drivers of 5.25 inches and 1 front-end driver of 3.5 inches, and flexible mechanical design supporting PS/2 single power supply and redundant power supply. With its stable performance, Advantech industrial personal computer has been widely used and deeply favored by a large number of customers.

Corerain nebula accelerator: Corerain nebula accelerator X3 is the world's first data flow architecture deep learning inference equipment equipped with CAISA chip, which is compiled and deployed using RainBuilder compilation tool. Corerain tool chain RainBuilder is the development and deployment tool chain corresponding to Corerain CAISA architecture, which includes three parts: RbCompiler, RbRuntime and RbDriver, where the RbCompiler is configured to translate a trained deep learning network into expression forms compatible with CAISA engine, and RbRuntime and RbDriver together constitute the software layer program when CAISA accelerates processing. The accelerator X3 is an industrial HHHL (half-height and half-length) single-slot PCIe board card with a power consumption of less than 60 W. The accelerator X3 has the peak performance of 10.9TOPS, the chip utilization up to 95.4%, the interface adopting PCIe 3.0×8, on-board memory of 8 GB DDR4, power supply PCIe, active cooling (single fan), working temperature of −20° C.-70° C., and external dimension of 169.5 mm×69.6 mm.

Due to its lightweight specification, the high-performance accelerator can be adapted to different types of computer equipment, including personal computers, industrial computers, network video recorders, workstations, servers and the like. The main chip of Corerain accelerator is CAISA. Due to the unique data flow architecture of CAISA, X3 accelerator can support most commonly used deep learning operators. Therefore, from a design point of view, any equipment equipped with this chip can accelerate most mainstream deep learning networks and achieve the acceleration effect of low delay and high chip utilization (theoretically up to 95.4% or even higher). Corerain accelerator is known as home-made GPU. Under a same performance condition, Corerain accelerator has its own unique advantages in the inference end, which can be well embedded in a variety of equipment ends to achieve end-to-end inference.

Model Conversion

Figure 5:
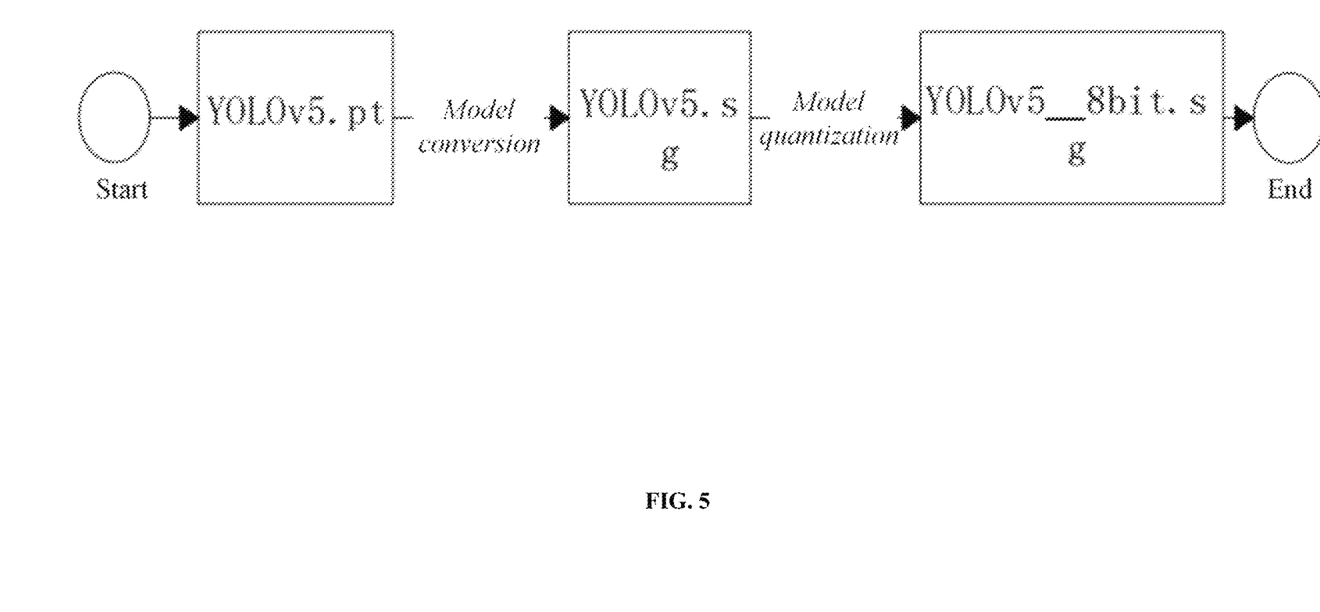
FIG. 5 is a flowchart illustrating model conversion.

After the improved YOLOv5 algorithm of the present disclosure is trained, a weight of yolov5.pt is obtained, which is deployed to the industrial personal computer and subject to inference acceleration using the Corerain accelerator. First, model conversion needs to be completed, and the flowchart of model conversion is shown in FIG. 5.

When the Pytorch model is converted to SG_IR, it is necessary to save a model file in the running path in advance, which contains the .pt file of the model and the corresponding image preprocessing file preprocess.py, and then the RbCli instruction is used to convert the corresponding input model into the initial SG-IR. Quantization refers to the process of conducting low-bit data compression on the initial SG-IR. With the floating-point SG-IR generated in the previous step as the input, 8 bit integer SG-IR is output. During quantization of the flowchart, it is required to specify image preprocessor, quantization range, path of datasets to be quantized, etc. After putting the quantized SG_IR into an executable file, and running the program, inference application can then be conducted on the Corerain accelerator.

Figure 6:
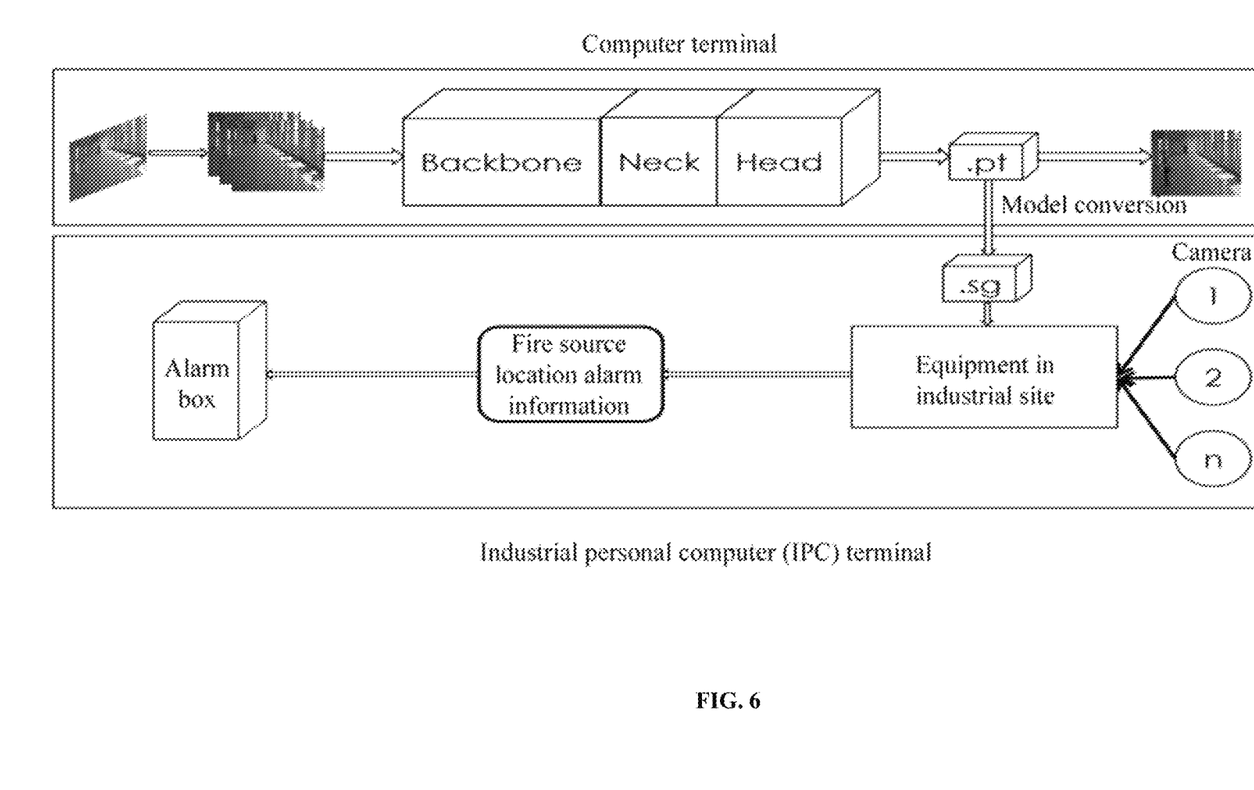
FIG. 6 is a general flowchart illustrating application of the method of the present disclosure to the industry.
Figure 7:
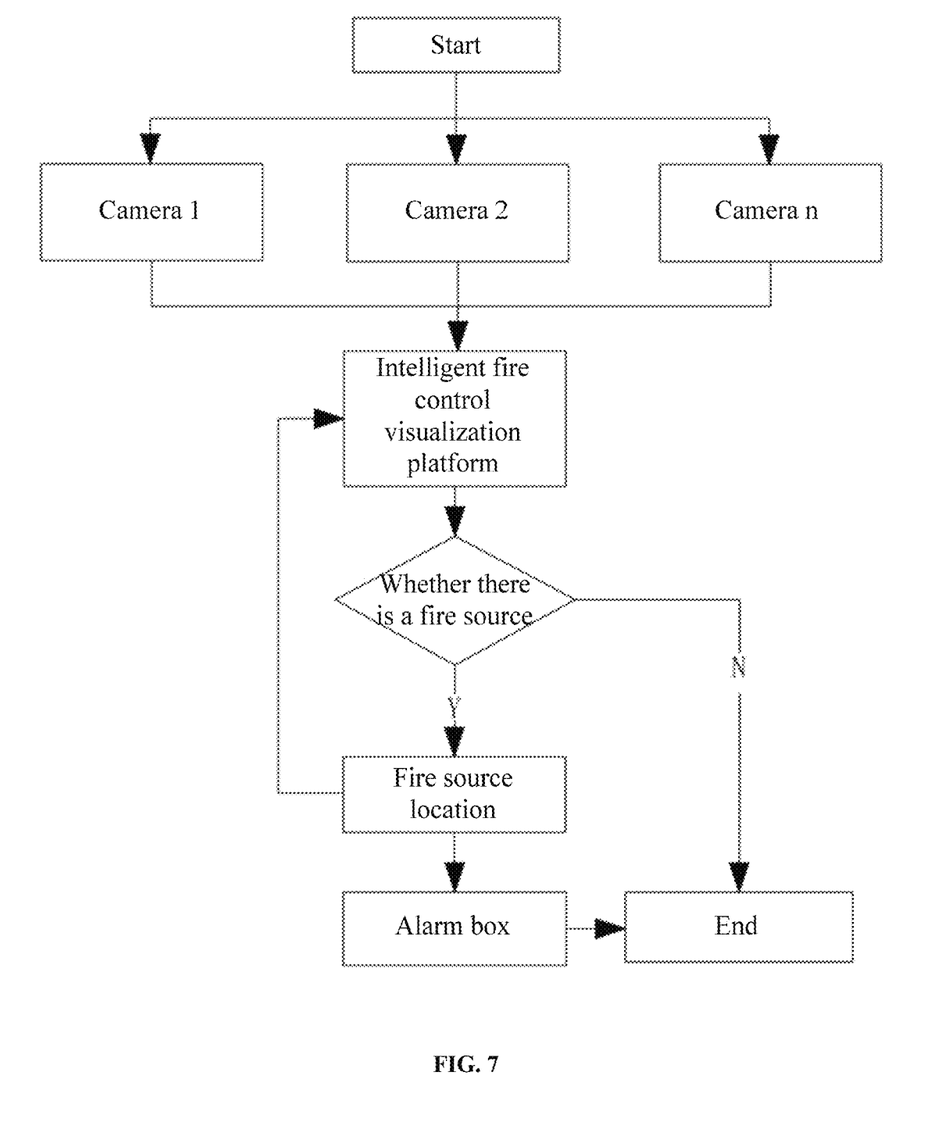
FIG. 7 is a flowchart illustrating model-based inference.

In actual use, as shown in FIGS. 6 and 7, following implementation steps are included:

installing PCIE drive and enabling device-manager service before running the Corerain accelerator. In the present disclosure, JS (JavaScript) language is adopted to develop a set of intelligent fire control visualization platform system, and the codes at the inference end are embedded into the system to realize the interface visualization operation.

JS is a high-level scripting language for fan-in network, which has been widely used in Web application development, adding a variety of dynamic functions to web pages and offering users a more fluent and beautiful browsing effect.

Customized infrared imaging and visible light imaging Xiongmai camera is adopted. The video stream captured by Xiongmai camera on site is transmitted to the industrial personal computer through the rtsp protocol, and meanwhile, the Corerain accelerator is enabled for inference. One industrial personal computer can be connected to multiple cameras through a network cable at the same time, thus realizing parallel inference at multiple network ports. The test results are displayed on an intelligent platform, which will show whether there is a fire source in the current scene. Once a fire source is detected, its location will be quickly and accurately determined and displayed on a window interface. If a fire source is detected, an alarm signal will be output, and will be transmitted to the alarm box through the serial port. The alarm signal will be sent to inform a user of a fire source, and the alarm box keeps working before the fire source is extinguished. The workflow is shown in FIG. 7.

Aiming at the specific field of fire detection, and the problems of the limited detection range, low precision and time consumption of a traditional fire detector, and the small sample capacity in the field of industrial fire control, the present disclosure proposes an improved YOLOv5 fire detection method based on data enhancement, which carries out a series of enhancement operations on the acquired data, improves the quality and quantity of datasets, fine-tunes the YOLOv5 structure, adds attention modules to improve the expression ability of feature extraction, and adopts improved Mosaic9 enhancement to improve the detection accuracy of small targets, and improve the effect of fire detection, especially under the condition of a small sample size. Experiments show that the model can achieve precise and rapid fire detection, the improved model is transplanted to the Advantech industrial personal computer, and the Corerain accelerator is used for inference accelerating, such that end-to-end real-time processing of the industrial site is achieved, and the visualization effect is achieved with the configuration of an intelligent interface. Compared with a traditional method of using sensors for fire detection, the fire detection system proposed by the present disclosure has numerous advantages of real-time performance, visualization and convenience, can accurately locate a fire source, and has a particularly remarkable effect in investigating the cause of a fire and attribution of liability, which can be well deployed to various kinds of industrial sites.

According to the present disclosure, a detection model can be deployed on the homemade Corerain accelerator at the edge end, which can well improve the detection performance, while saving the development cost and improving the industrial security. End-to-end real-time detection in the industrial site is achieved, and the integration of intelligent fire control is achieved by using an intelligent fire visualization interface to monitor a whole set of equipment such as the camera, industrial personal computer, alarm box and so on.

The above embodiments are merely preferred specific implementations of the present disclosure, and the scope of protection of the present disclosure is not limited thereto. All simple variations or equivalent substitutions of the technical solution apparently obtained by any person skilled in the art within the technical scope disclosed by the present disclosure should fall within the protection scope of the present disclosure.

What is claimed is:

1. A fire source detection method, comprising the following steps:
    acquiring fire source image data from an industrial site;
    constructing a fire source detection model; and
    inputting the fire source image data to the fire source detection model, and analyzing the fire source image data via the fire source detection model to obtain a detection result, wherein the detection result comprises a specific location, precision and type of a fire source; wherein
    said constructing the fire source detection model specifically comprises:
    introducing a convolutional block attention module (CBAM) into a backbone network of a YOLOv5 algorithm to construct a CBAM structure;
    introducing Label Smoothing into a prediction layer of the YOLOv5 algorithm;
    introducing a data enhancement method Mosaic9 into the YOLOv5 algorithm to construct an improved YOLOv5 model; and
    training the improved YOLOv5 model by using the fire source image data to obtain a model weight of fire source detection and the fire source detection model.

2. The fire source detection method according to claim 1, wherein said acquiring fire source image data from an industrial site specifically comprises:
    acquiring fire source video data in different scenes by using infrared imaging and visible light imaging cameras, and saving the fire source video data.

3. The fire source detection method according to claim 2, wherein before training the improved YOLOv5 model using the fire source image data, the method further comprises preprocessing the fire source, which specifically comprises:
- labeling the acquired fire source image data, comprising labeling target location information and type information of images, to obtain a label file;
- conducting data enhancement on the label file to increase a sample capacity of the fire source image data and a number of fire source targets in the fire source images; and
- training the improved YOLOv5 model by using the fire source image data obtained after data enhancement.

4. The fire source detection method according to claim 3, wherein said conducting data enhancement on the label file comprises:
- increasing the sample capacity of the fire source image data by flipping, translating and scaling the fire source image data; and
- increasing the number of the fire targets in the fire source images via a spoon-feeding data enhancement method.

5. The fire source detection method according to claim 4, wherein the spoon-feeding data enhancement method comprises:
- reading the label file to determine whether there are any targets in the file that need to be enhanced;
- copying the targets that need to be enhanced and randomly converting the copied targets;
- pasting the randomly converted targets onto original images or other image; and
- if the pasted new targets do not overlap with original targets, pasting the new targets on the images using Poisson blending to obtain enhanced images and labels.

6. The fire source detection method according to claim 1, wherein a smoothened label obtained via the label smoothing method is:

$$q'_i = (1 - \varepsilon)q_i + \frac{\varepsilon}{K}$$

wherein $q_i$ denotes a ground truth label, c denotes a constant, and K denotes a number of types under classification.

7. The fire source detection method according to claim 4, wherein the data enhancement method Mosaic9 comprises a process of combining 9 images into one picture through random cropping, random scaling, and random arrangement.

8. The fire source detection method according to claim 3, wherein existing fire source image data of other scenes is acquired on an Internet side, and the improved YOLOv5 model is trained through the fire source image data obtained after data enhancement and the existing fire source image data.

9. A fire source detection device, comprising a memory, a processor, and a computer program stored in the memory and executable on the processor, wherein the processor implements the steps of the method according to claim 1 when executing the computer program.

10. The fire source detection device according to claim 9, wherein said acquiring fire source image data from an industrial site specifically comprises:
- acquiring fire source video data in different scenes by using infrared imaging and visible light imaging cameras, and saving the fire source video data.

11. The fire source detection device according to claim 10, wherein before training the improved YOLOv5 model using the fire source image data, the method further comprises preprocessing the fire source, which specifically comprises:
- labeling the acquired fire source image data, comprising labeling target location information and type information of images, to obtain a label file;
- conducting data enhancement on the label file to increase a sample capacity of the fire source image data and a number of fire source targets in the fire source images; and
- training the improved YOLOv5 model by using the fire source image data obtained after data enhancement.

12. The fire source detection device according to claim 11, wherein said conducting data enhancement on the label file comprises:
- increasing the sample capacity of the fire source image data by flipping, translating and scaling the fire source image data; and
- increasing the number of the fire targets in the fire source images via a spoon-feeding data enhancement method.

13. The fire source detection device according to claim 12, wherein the spoon-feeding data enhancement method comprises:
- reading the label file to determine whether there are any targets in the file that need to be enhanced;
- copying the targets that need to be enhanced and randomly converting the copied targets;
- pasting the randomly converted targets onto original images or other image; and
- if the pasted new targets do not overlap with original targets, pasting the new targets on the images using Poisson blending to obtain enhanced images and labels.

14. The fire source detection device according to claim 9, wherein a smoothened label obtained via the label smoothing method is:

$$q'_i = (1 - \varepsilon)q_i + \frac{\varepsilon}{K}$$

wherein $q_i$ denotes a ground truth label, c denotes a constant, and K denotes a number of types under classification.

15. The fire source detection device according to claim 13, wherein the data enhancement method Mosaic9 comprises a process of combining 9 images into one picture through random cropping, random scaling, and random arrangement.

16. The fire source detection device according to claim 12, wherein existing fire source image data of other scenes is acquired on an Internet side, and the improved YOLOv5 model is trained through the fire source image data obtained after data enhancement and the existing fire source image data.

* * * * *